(12) United States Patent
Coleman

(10) Patent No.: US 6,397,826 B1
(45) Date of Patent: Jun. 4, 2002

(54) FUEL COOLING SYSTEM FOR FUEL EMULSION BASED COMPRESSION IGNITION ENGINE

(75) Inventor: Gerald N. Coleman, Peoria, IL (US)

(73) Assignee: Clean Fuel Technology, Inc., Reno, NV (US)

( * ) Notice: Subject to any disclaimer, the term of this patent is extended or adjusted under 35 U.S.C. 154(b) by 0 days.

(21) Appl. No.: 09/216,337

(22) Filed: Dec. 18, 1998

(51) Int. Cl.[7] .............................................. F02M 15/00
(52) U.S. Cl. ...................................... 123/541; 123/514
(58) Field of Search ................................ 123/510, 514, 123/541, 41.31

(56) References Cited

U.S. PATENT DOCUMENTS

| | | | |
|---|---|---|---|
| 3,918,412 A | | 11/1975 | Lindstrom ...................... 123/3 |
| 3,973,536 A | * | 8/1976 | Zelders ........................ 123/541 |
| 4,279,223 A | | 7/1981 | Csonka et al. ............. 123/25 N |
| 4,411,239 A | * | 10/1983 | Kelch ........................... 123/557 |
| 4,416,225 A | | 11/1983 | Constantine et al. ....... 123/25 E |
| 4,438,731 A | | 3/1984 | Maggio ...................... 123/25 N |
| 4,454,851 A | * | 6/1984 | Bourbonnaud et al. ...... 123/557 |
| 4,519,358 A | * | 5/1985 | Redele ......................... 123/557 |
| 4,640,235 A | | 2/1987 | Martin ..................... 123/41.03 |
| 4,872,438 A | * | 10/1989 | Ausiello et al. ............. 123/514 |
| 5,044,339 A | * | 9/1991 | Hafner ......................... 123/456 |
| 5,245,953 A | | 9/1993 | Shimada et al. .......... 123/25 E |
| 5,251,603 A | * | 10/1993 | Watanabe et al. ............ 123/541 |
| 5,284,120 A | * | 2/1994 | Fukushima et al. ......... 123/510 |
| 5,535,708 A | | 7/1996 | Valentine ................... 123/25 C |
| 5,626,121 A | * | 5/1997 | Kushida et al. .............. 123/514 |
| 5,694,908 A | | 12/1997 | Hsu .............................. 123/637 |
| 5,718,194 A | | 2/1998 | Binion ...................... 123/25 C |
| 5,878,718 A | * | 3/1999 | Rembold et al. ............ 123/456 |
| 5,887,572 A | * | 3/1999 | Channing .................... 123/514 |
| 5,918,578 A | * | 7/1999 | Oda ............................. 123/456 |
| 5,983,869 A | * | 11/1999 | Cooke et al. ................. 123/514 |
| 6,024,064 A | * | 2/2000 | Kato et al. ............... 123/179.17 |

* cited by examiner

Primary Examiner—Noah P. Kamen
(74) Attorney, Agent, or Firm—Sierra Patent Group, Ltd.

(57) ABSTRACT

The present invention improves operation of a compression ignition engine using a fuel emulsion. Fuel emulsions tend to separate at high temperatures and pressures as a surfactant in the emulsion looses its effectiveness. The present invention employs a fuel cooling device to reduce the fuel emulsion temperature before returning the fuel emulsion to a fuel tank.

13 Claims, 3 Drawing Sheets

FUEL COOLING SYSTEM FOR FUEL EMULSION BASED COMPRESSION IGNITION ENGINE

TECHNICAL FIELD

This invention relates generally to an internal combustion engine operating on an emulsion of fuel and water and more specifically to cooling the fuel emulsion being returned from a fuel rail.

BACKGROUND ART

Engine manufacturers, governments, environmentalists, and consumers are all concerned with reducing pollution created from combusting a fuel and air mixture. Typical pollutants include an uncertain mixture of oxides of nitrogen (NOx), carbon monoxide (CO), unburned hydrocarbons (UHC), and particulates. Each of these pollutants generally forms through different combustion mechanisms or at different stages of combustion. Most of the pollutants decrease with increased engine efficiency. Increasing a flame temperature of combustion is one manner of increasing engine efficiency. In general, higher flame temperatures reduce UHC and CO types of pollution.

Conversely, NOx generally increases as the flame temperature increases. NOx currently may be reduced in the following manners: a) after treatment, b) reformulated fuels, c) exhaust gas recirculation, d) water injection, and e) operating engine at lower loads. Each of the above manners has associated problems. For example, after treatment currently requires additional hardware. Reformulated fuels may lead to a reduction in power, redesign of current engines, and additional hardware on the engine. Exhaust gas recirculation and water injection both attempt to reduce localized in-cylinder temperatures by the addition of a diluent. Exhaust gas recirculation reduces the engine efficiency. Water injection requires both additional hardware (including a water storage tank and a water injector) and a clean water supply. Another option may be to operate the engine at a less than optimal condition, but other forms of pollution may then increase.

A fuel emulsion operates similar to water injection without the need for a fresh supply of water or additional water injectors. The fuel emulsion suspends water in an oil-based fuel or suspends an oil-based fuel in water. In any event, the water reduces the flame temperature. Since the water and fuel are blended, one injector may deliver the fuel emulsion instead of using a separate water injector and fuel injector.

While the fuel emulsion operates generally like the oil-based fuel or water initially, fuel emulsions can break down into their components in high temperature and/or high shear stress conditions. In most fuel systems, the fuel starts at an ambient temperature and ambient pressure in a fuel tank. In many systems, a fuel line passes through or is formed in the engine block or an engine head. As the fuel passes through the fuel line, the fuel increases in temperature. These temperatures may range upwards of 100° C. As more of the fuel emulsion is returned from the engine back to the tank, a bulk temperature of the fuel emulsion in the tank will increase in temperature. Some surfactants in the fuel emulsion may have reduced ability to hold the water and fuel together at the increased temperatures.

The increased temperature of the fuel emulsion may also lead to boiling off of a constituent having a low boiling point. A fuel transfer pump and/or intensifier will increase the pressure of the fuel emulsion in the fuel lines above the pressure of the fuel emulsion in the tank. While the fuel emulsion is at a high temperature and high pressure, a boiling point of the constituent may be sufficiently above the temperature of the fuel emulsion. However, the expansion of the fuel emulsion to the pressure of the tank may greatly lower the boiling point of the constituent and result in the constituent flashing into a gaseous phase. This becomes even more problematic where the engine is operating at a high altitude. At the high altitude, the pressure in the tank will be below pressures experienced at sea level. The gaseous phase in the return lines may cause erroneous readings of sensors in the return lines and/or venting of the constituent.

The present invention is directed at overcoming one or more of the problems set forth above.

DISCLOSURE OF THE INVENTION

In one aspect of the present invention a fuel emulsion injection system for an internal combustion engine has a fuel tank. A fuel rail fluidly connects with the fuel tank. Fuel injectors fluidly connect with the fuel rail. A fuel return line connects to a return side of the fuel rail and to the fuel tank. A fuel cooling device fluidly connects with the fuel return line. The fuel cooling device reduces a temperature of a fuel emulsion.

In another aspect of the invention, a method prevents dissolution of a fuel emulsion in a pressurized fuel system for a compression ignition engine by cooling the fuel emulsion returning from a fuel injector to a temperature below a prescribed temperature and expanding the fuel emulsion to the pressure of a fuel tank.

BEST MODE FOR CARRYING OUT THE INVENTION

Figure 1:
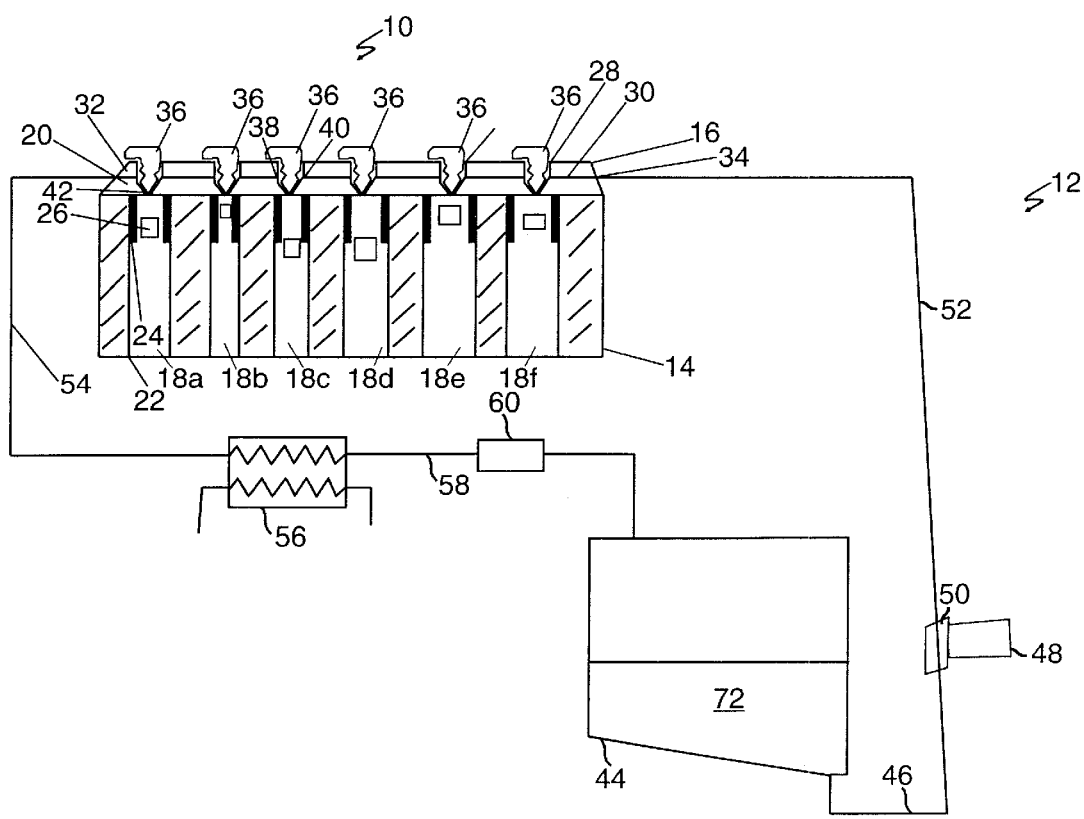
FIG. 1 is a schematic diagram of a fuel injection system in accordance with the present invention.

In FIG. 1, an engine 10 is shown having a fuel system 12 attached. The engine 10 has a block 14 and a head 16. In this application the block 14 defines six cylinders 18a–f each having a first end 20 and a second end 22. While a six cylinder inline engine block is shown, the invention will work with all internal combustion engines including engines having different configurations and a different number of cylinders. Each cylinder 18 has a combustion liner 24 positioned therein. A piston 26 is slidably positioned in the combustion liner 24.

The head 16 rests on the block 14 proximate the first end 20. The head 16 defines a plurality of fuel injector ports 28 and a fuel rail 30. In this application, the fuel injector ports 28 are generally cylindrical and pass through the head 16 into the cylinder. The fuel rail 30 has a supply side 32 and a return side 34. The fuel rail 30 fluidly connects the fuel injector ports 28. In the preferred embodiment, the fuel rail 30 is cast in the head 16. The fuel rail 30 may also be bored into the head 16.

Figure 2:
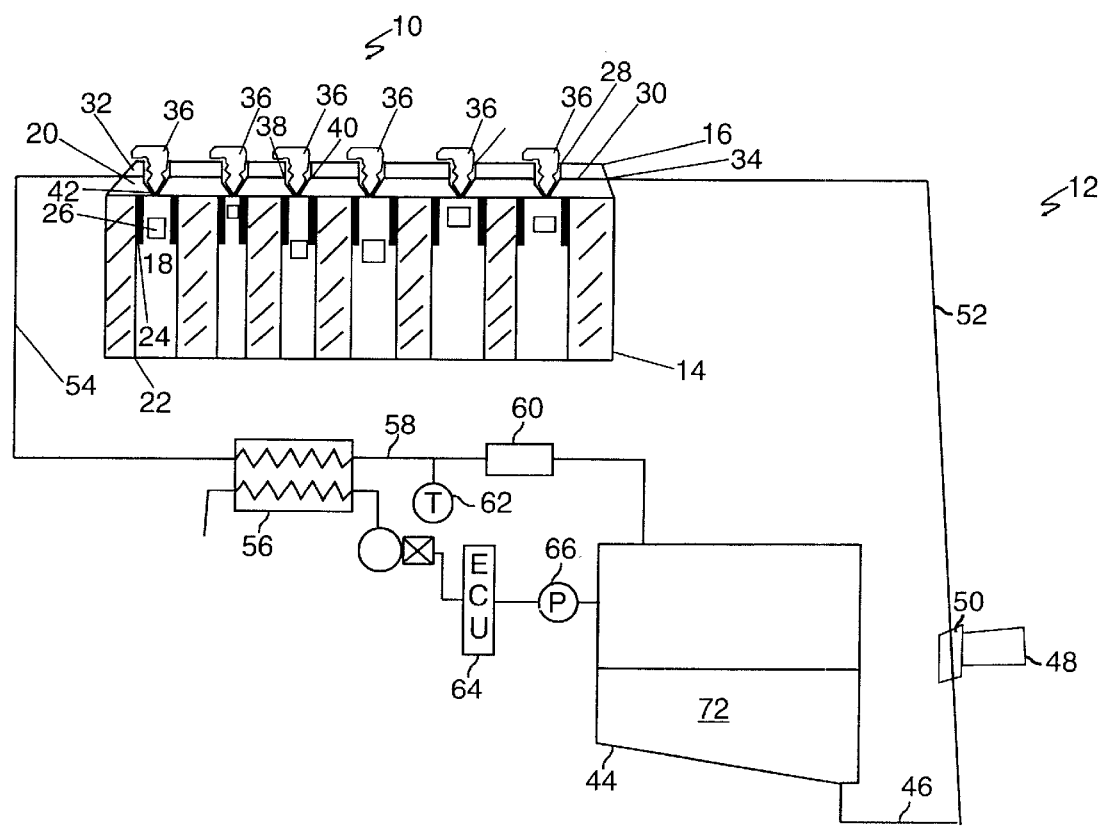
FIG. 2 is a schematic diagram of the fuel injection system showing an alternate embodiment of the present invention.

A fuel injector 36 shown in FIG. 2 is positioned in each of the fuel injector ports 28. The fuel injector 36 has a fuel inlet 38, a fuel drain 40, and a nozzle portion 42. The fuel inlet 38 and fuel drain 40 fluidly connect with the fuel rail

30. The nozzle portion 42 is in fluid communication with the first end 20 of the cylinder 18. In this application, each fuel injector 36 includes an intensifier pump 43. Other injection systems may use a separate pump feeding all of the injectors.

A fuel tank 44 connects to a fuel tank conduit 46. A fuel filter 48 connects with fuel tank conduit 46 intermediate of the fuel tank 44 and a fuel transfer pump 50 in a conventional manner. A fuel delivery conduit 52 connects the fuel transfer pump 50 with the supply side 32 of the fuel rail 30.

A relief conduit 54 attaches to the return side 34 of the fuel rail 30. The relief conduit 54 connects to a fuel cooling device 56. In this application, the fuel cooling device 56 is an air-fuel heat exchanger. However, an oil-fuel heat exchanger, jacket water heat exchanger or other cooling devices may also be used. A fuel return line 58 connects the fuel cooling device 56 with the fuel tank 44. A relief valve 60 is positioned in the fuel return line 58 preferably between the fuel tank 44 and fuel cooling device 56. FIG. 1 shows the relief valve 60 as a mechanical relief valve.

FIG. 2 shows another embodiment for actively controlling cooling of the fuel emulsion having a temperature sensor 62 positioned downstream of the fuel cooling device 56. In this embodiment, the temperature sensor 62 connects to a controller 64. The heat exchanger has a coolant control device 65. The coolant control device 65 is connected to the controller 64. The coolant control device 65 has a first position an a second position. In the first position, the coolant control valve 65 promotes the flow of coolant to the fuel cooling device 56. The second position prevents coolant from flowing to the fuel cooling device 56. In the preferred embodiment, the controller 64 is an electronic controller as is commonly used in the art. To further improve the control of fuel cooling device 56, an optional pressure sensor 66 may be positioned in the fuel return line 58 downstream from relief valve 60. Alternatively, the pressure sensor 66 may be positioned in the fuel tank 44. The pressure sensor 66 is connected to the controller 64.

Figure 3:
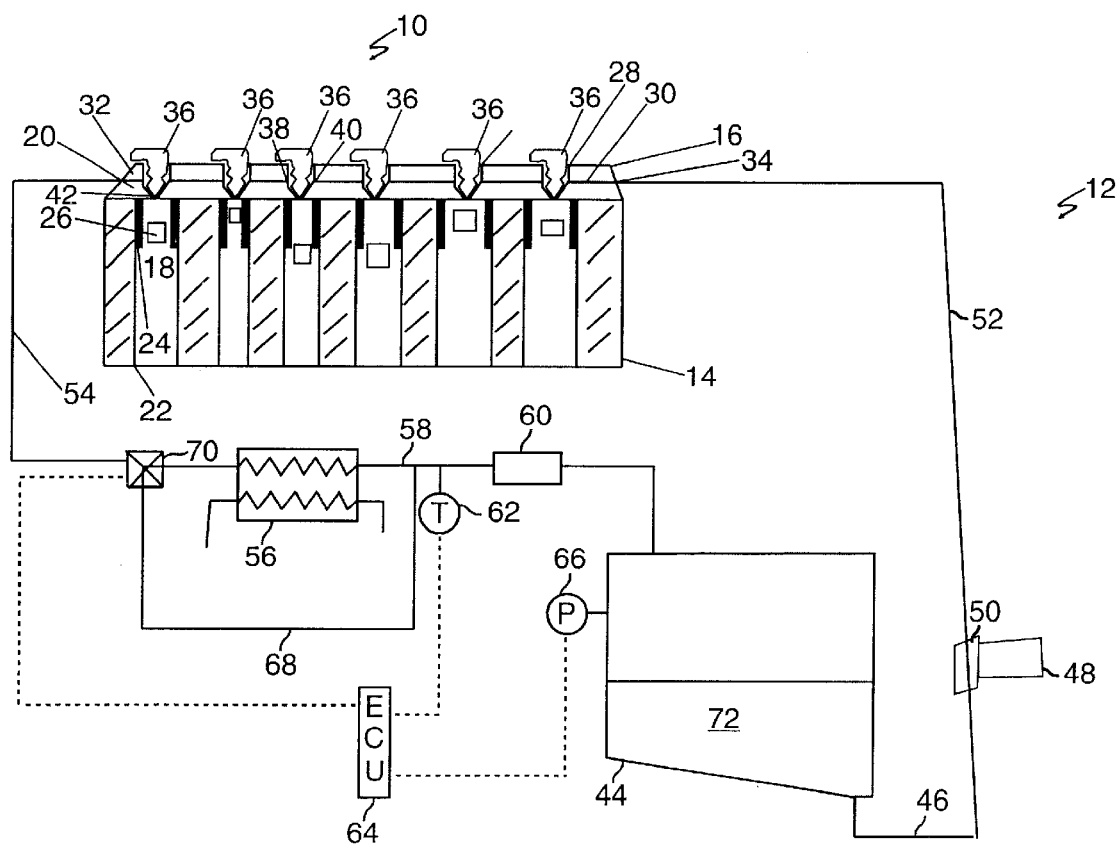
FIG. 3 is a schematic diagram of the fuel injection system showing another alternate embodiment of the present invention.

FIG. 3 shows another embodiment for actively controlling cooling of the fuel emulsion having a by-pass conduit 68 connected to the relief conduit 54 upstream of the fuel cooling device 56 and to the fuel return line 58 downstream of the fuel cooling device 56. A by-pass valve 70 is positioned in operative association with the by-pass conduit 68. The by-pass valve 70 has a first position promoting fluid communication between the relief conduit 54 and the by-pass conduit 68. A second position inhibits fluid communication between the relief conduit 54 and the by-pass conduit 68. Optionally, the first position may also prevent fluid communication between the relief conduit 54 and fuel cooling device 56. The controller 64 connects to the by-pass valve 70. The temperature sensor 62 and optional pressure sensor 66 connect to the controller 64.

The fuel tank 44 in this embodiment holds a fuel emulsion 72 containing the following constituents: a hydrocarbon distillate fuel, purified water, a surfactant, and a surfactant enhancer. Examples of suitable hydrocarbon petroleum distillate fuels include kerosene, diesel, naphtha, and aliphatics and paraffinics, used alone or in combination with each other. Preferred primary surfactants include charged amide surfactants, more preferably unsubstituted, mono- or di-substituted amides of saturated or unsaturated $C_{12}-C_{22}$ fatty acids. Additionally, the fuel emulsion 72 may include one or more additives, for example, antifreezes, ignition delay modifiers, cetane improvers, stabilizers, lubricants, corrosion inhibitors, rheology modifiers, and the like.

Industrial Applicability

In operation, the fuel system 12 as shown in FIG. 1 delivers the fuel emulsion from the fuel tank 44 through the fuel injectors 36 and returns some of the fuel emulsion back to the fuel tank 44 in response to fuel demand as determined by engine load and engine speed. The present invention prevents the water and fuel in the fuel emulsion 72 from separating by lowering the temperature of the fuel emulsion 72 prior to expansion to the pressure of the fuel tank 44. Lowering the temperature of the fuel emulsion 72 increases the effectiveness of the surfactants. Reducing the temperatures of the fuel emulsion 72 allows the fuel emulsion to be stored in the fuel tank 44 for longer periods of time.

The fuel emulsion 72 from the fuel tank 44 is drawn through the fuel tank conduit 46 into the fuel transfer pump 50. The fuel emulsion 72 exiting the fuel transfer pump 50 travels through the fuel delivery conduit 52 into the fuel rail 30. The Fuel emulsion 72 in the fuel rail 30 enters the fuel inlet 38 of the fuel injector 36. Part of the fuel emulsion 72 is injected from the nozzle portion 42 into the cylinder 18. Another part of the fuel exits the fuel drain 40 back into the fuel rail 30 where other injectors may use the fuel emulsion 72. Even during high engine loads, the engine may use only one gallon of every four gallons of fuel delivered to the fuel rail 30. The fuel emulsion 72 gains temperature from the head 16 as it passes through the fuel rail 30. In a conventional medium speed compression ignition engine, the temperature of the fuel emulsion 72 in some applications may increase by 50° C. as the fuel emulsion move from the supply side 32 to the return side 34.

After exiting the engine head 16 from the return side 34, the heated fuel emulsion is returned to the fuel tank 44. However, expanding the fuel emulsion to the pressure of the fuel tank 44 may lead to vaporization of the constituents of the fuel emulsion which have low boiling points. Pressures in the fuel return line 58 may be anywhere from 200–700 kPa. At these elevated pressures, the boiling point of the constituents will be well above the temperature of the fuel in the fuel return line 58. Pressures in the fuel tank 44 may range from around 101 kPa at sea level to around 74.7 kPa at 2500 meters above sea level. Cooling the fuel emulsion 72 in the fuel cooling device 56 prior to expanding the fuel emulsion to pressures in the fuel tank 44 greatly reduces the risk of vaporizing any constituents of the fuel emulsion.

For the fuel cooling device 56 to operate effectively, the pressure in the fuel return line 54 must be greater than an opening pressure of the relief valve 60 and a pressure in the relief conduit 58. When the relief valve 60 opens the cooled, higher pressure fuel emulsion in the fuel return line 54 will migrate towards the relief conduit 58. The fuel emulsion in the return line 58 passes through the relief conduit 58 into the fuel tank 44.

The cooled fuel emulsion 72 in turn prevents the temperature of the fuel emulsion 72 in the fuel tank 44 from increasing. The lower temperature in the fuel tank 44 allows the fuel emulsion 72 to be stored for longer periods of time without the constituent coming out of solution. At higher temperatures surfactants used in the fuel emulsion become less effective. As their effectiveness decreases, fuel and water in the fuel emulsion 72 become more prone to separate.

As shown in FIG. 2, the controller 64 may rely on the downstream temperature sensor 62 to control the coolant control valve 65 on the fuel cooling device 56. The temperature sensor is adapted to measure a fuel temperature and sends a signal indicative of the measured temperature to the controller. In this embodiment, the fuel cooling device 56 is sized to maintain a bulk temperature of the fuel emulsion 72 below a temperature where the constituents might boil-off. The controller will contain a predetermined boiling point for the fuel emulsion 72. The fuel cooling device 56 will maintain the temperature of the fuel emulsion 72 in the fuel return line 58 below the boiling point by moving the coolant control valve 65 towards the first position as the indicated temperature in the fuel return line increases.

At higher altitudes where the fuel tank 44 is at a lower pressure, the constituents will boil-off at lower temperatures. Using the optional pressure sensor 66 in the fuel relief conduit 58 allows the controller 64 to calculate an estimate of the boiling point for the fuel emulsion 72 to further control the fuel cooling device 56. The pressure sensor 66 measures a pressure in the fuel relief conduit 58 and sends a signal indicative of the measured pressure to the controller 64. The following table shows of variations in boiling point of water with regard to altitude as one example of a boiling point estimate of one constituent of the fuel emulsion 72.

| Altitude (Ft) | Altitude (m) | p (kPa) | p (psi) | Boiling point Temp (° C.) | Boiling point Temp (° F.) |
|---|---|---|---|---|---|
| 0 | 0 | 101 | 14.69 | 100 | 212 |
| 1000 | 304.8 | 97.8 | 14.18 | 99 | 210.2 |
| 2000 | 609.6 | 94.4 | 13.69 | 98 | 208.4 |
| 3000 | 914.4 | 91.1 | 13.21 | 97 | 206.6 |
| 4000 | 1219.2 | 87.9 | 12.75 | 96.1 | 204.98 |
| 5000 | 1524 | 84.9 | 12.31 | 95.1 | 203.18 |
| 6000 | 1828.8 | 81.9 | 11.88 | 94.2 | 201.56 |
| 7000 | 2133.6 | 79.1 | 11.47 | 93.2 | 199.76 |

Instead of controlling the coolant control valve 65, the alternate embodiment shown in FIG. 3 controls the by-pass valve 70. The by-pass valve 70 moves to the first position when the temperature sensed by the temperature sensor 62 is below some predetermined boiling point of the constituents. Like the embodiment in FIG. 2, the pressure sensor 66 may be used to estimate the boiling points instead of using the predetermined boiling point.

Both the embodiment in FIG. 2 and FIG. 3 may be used to vary the amount of cooling. For example, during start-up the engine head 16 may be at ambient temperatures. In this situation the, fuel emulsion 72 will gain little heat from the head 16 and will therefore need little if any cooling. In another instance, the fuel emulsion 72 may need the heat from the head 16 to prevent the fuel from entering a cloud point or where the fuel emulsion may begin to gel. Gelling of the fuel may be especially troublesome as the engine is used in various climates without changing fuels. For these instances, the by-pass in FIG. 3 would move to the first position and the coolant control valve in FIG. 2 would move toward the second positions while in the cooler climates to prevent over-cooling the fuel emulsion.

Other aspects, objects and advantages of this invention can be obtained from a study of the drawings, the disclosure and the appended claims.

What is claimed is:

1. A fuel emulation injection system for an internal combustion engine comprising:
   a fuel tank;
   a fuel rail having a supply side and return side, said supply side being fluidly connectable with said tank;
   a fuel injector being fluidly connectable with said fuel rail;
   a fuel return line being fluidly connectable intermediate said return side and said fuel tank;
   a pressure-activated fuel cooling device being fluidly connectable with said fuel return line said fuel cooling device adapted to reduce a temperature of a fuel emulsion below some prescribed temperature.

2. The fuel emulsion injection system as specified in claim 1, further comprising a relief valve being connectable with said fuel return line, said relief valve being adapted to regulate a pressure of said fuel emulsion in said return line.

3. The fuel emulsion injection system as specified in claim 2 wherein said relief valve being mechanically actuated.

4. The fuel emulsion injection system as specified in claim 2 wherein said relief valve being positioned downstream from said fuel cooling device.

5. The fuel emulsion injection system as specified in claim 4, further comprising:
   a by-pass conduit having a first connection with said fuel return line upstream of said fuel cooling device and a second connection intermediate said fuel cooling device and said relief valve; and
   a by-pass valve being fluidly connectable with said by-pass conduit, said by-pass valve being adapted to move between a first and second position, said first position promoting a fluid communication between said fuel return line and said by-pass conduit, said second position inhibiting fluid communication between said fuel return line and said by-pass conduit.

6. The emulsion injection system as specified in claim 2 further comprising:
   a controller;
   a temperature sensor being fluidly connectable with said fuel return line downstream of said fuel cooling device, said temperature sensor being adapted to sense a fuel temperature, said temperature sensor being adapted to send a temperature signal indicative of the sensed fuel temperature to said controller.

7. The fuel emulsion system as specified in claim 6 further comprising:
   a by-pass conduit having a first connection with said fuel return line upstream of said fuel cooling device and a second connection intermediate said fuel cooling device and said relief valve; and
   a by-pass valve being fluidly connectable with said by-pass conduit, said by-pass valve being adapted to move between a first and second position, said first position promoting a fluid communication between said fuel return line and said by-pass conduit, said second position inhibiting fluid communication between said fuel return line and said by-pass conduit;
   said controller being connectable with said by-pass valve, said controller being adapted to move said by-pass valve according to said sensed fuel temperature, said valve being proximate said second position while said sensed temperature being above said prescribed temperature, said by-pass valve being proximate said first position while said sensed fuel temperature being below said prescribed temperature.

8. The fuel emulsion injection system as specified in claim 7 further comprising a pressure sensor fluidly being fluidly connectable with said fuel injection system downstream from said relief valve, said pressure sensor being adapted to measure a pressure of said fuel emulsion, said pressure sensor being adapted to send a pressure signal to said controller, said controller calculating said prescribed temperature according to said sensed pressure.

9. The fuel emulsion injection system as specified in claim 6 further comprising a coolant control valve being connectable with said fuel cooling device, said coolant control valve having a first position promoting the flow of a coolant, said coolant control valve having a second position prohibiting the flow of a coolant, said controller being connectable with said coolant control valve, said controller being adapted to move said coolant control valve from said second position to said first position as the sensed temperature increased over said prescribed temperature.

10. The fuel emulsion injection system as specified in claim 9 further comprising a pressure sensor being fluidly connected with a fuel return line downstream from said relief valve, said pressure sensor being connected with said controller, said pressure sensor being adapted to measure a pressure of said fuel emulsion, said pressure sensor being adapted to send a pressure signal to said controller, said controller calculating said prescribed temperature according to said sensed pressure.

11. A method of preventing dissolution of a fuel emulsion in a pressurized fuel system for a compression ignition engine comprising the steps of:
  cooling the fuel emulsion returning from a fuel injector to a temperature below a prescribed temperature prior to a expanding step;
  expanding said fuel emulsion to a pressure of a fuel tank;
  sensing a fuel emulsion pressure in a fuel return line downstream from an expansion device; and
  calculating said prescribed temperature according to said sensed pressure.

12. The method of preventing dissolution as specified in claim 11 wherein said cooling step being controlled by varying a coolant flow in a fuel cooling device.

13. The method of preventing dissolution as specified in claim 11 wherein said cooling step being controlled by varying a flow of fuel emulsion through a fuel cooling device.

* * * * *

UNITED STATES PATENT AND TRADEMARK OFFICE
CERTIFICATE OF CORRECTION

PATENT NO. : 6,397,826 B1
DATED : June 4, 2002
INVENTOR(S) : Coleman

It is certified that error appears in the above-identified patent and that said Letters Patent is hereby corrected as shown below:

<u>Column 8,</u>
Line 6, "a expanding step;" should read -- an expanding step; --

Signed and Sealed this

Thirtieth Day of July, 2002

Attest:

Attesting Officer

JAMES E. ROGAN
*Director of the United States Patent and Trademark Office*